US012603705B2

(12) United States Patent
D'Incà et al.

(10) Patent No.: US 12,603,705 B2
(45) Date of Patent: Apr. 14, 2026

(54) LATENCY EQUALIZATION FOR OPTICAL FILTER

(71) Applicant: Telefonaktiebolaget LM Ericsson (publ), Stockholm (SE)

(72) Inventors: Claudio D'Incà, Genoa (IT); Sergio Mosti, Genoa (IT); Alberto Deho, Genoa (IT); Roberto Magri, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 326 days.

(21) Appl. No.: 18/568,224

(22) PCT Filed: Jun. 29, 2022

(86) PCT No.: PCT/EP2022/067976
§ 371 (c)(1),
(2) Date: Dec. 7, 2023

(87) PCT Pub. No.: WO2023/275186
PCT Pub. Date: Jan. 5, 2023

(65) Prior Publication Data
US 2024/0297714 A1 Sep. 5, 2024

Related U.S. Application Data

(60) Provisional application No. 63/216,621, filed on Jun. 30, 2021.

(51) Int. Cl.
*H04B 10/2507* (2013.01)

(52) U.S. Cl.
CPC ................................. *H04B 10/2507* (2013.01)

(58) Field of Classification Search
CPC ........ H04B 10/2507; H04B 1/02; H04B 1/06; H04B 1/38; H04B 1/62; H04B 1/69;
(Continued)

(56) References Cited

U.S. PATENT DOCUMENTS 6,038,047 A * 3/2000 Nava .................... H04B 10/504
398/1
9,565,113 B2 * 2/2017 Venkatesh ............. H04L 47/125
(Continued)

FOREIGN PATENT DOCUMENTS

CA 2221761 A1 * 11/1996 ......... H04L 27/2614
CA 2990937 C * 1/2021 ......... H04Q 11/0005
(Continued)

OTHER PUBLICATIONS

Eugenio Ruggeri et al., "A 5G Fiber Wireless 4Gb/s WDM Fronthaul for Flexible 360° Coverage in V-Band massive MIMO Small Cells," Aug. 10, 2020, Journal of Lightwave Technology, vol. 39, No. 4, Feb. 15, 2021, pp. 1081-1086.*
(Continued)

*Primary Examiner* — Omar S Ismail
(74) *Attorney, Agent, or Firm* — Murphy, Bilak & Homiller, PLLC

(57) ABSTRACT

A padding unit comprising one or more fiber paddings is provided. Each of the one or more fiber paddings is for a respective one of one or more pairs of coupled channels in an optical device. At each pair of coupled channels, one channel in the pair of coupled channels is used as an upstream channel and the other channel in the pair of coupled channels is used as a downstream channel. Each fiber padding comprises a padding length of fiber configured to offset at least a part of a latency imbalance at the respective pair of coupled channels, the latency imbalance being a difference in latencies between the respective upstream and downstream channels caused by a difference in the multiplexing or demultiplexing path lengths of the respective upstream and downstream channels.

22 Claims, 5 Drawing Sheets

(58) Field of Classification Search

CPC ... H04B 3/02; H04B 3/54; H04B 3/04; H04B 3/20; H04B 3/32; H04B 3/36; H04B 3/46; H04B 1/707; H04B 1/713; H04B 1/7163; H04B 1/3816; H04B 1/3827; H04B 1/40; H04B 1/10; H04B 1/16; H04B 1/03; H04B 5/20; H04B 5/40; H04B 5/70; H04B 7/02; H04B 7/14; H04B 7/24; H04B 7/15; H04B 7/022; H04B 7/04; H04B 10/03; H04B 10/07; H04B 10/11; H04B 10/25; H04B 10/27; H04B 10/29; H04B 10/60; H04B 10/50; H04B 10/40; H04B 10/80; H04B 13/02; H04B 14/02; H04B 15/04; H04B 15/02; H04B 15/06; H04B 17/10; H04B 17/20; H04B 17/30; H04B 17/309; H04B 17/15; H04B 17/11

See application file for complete search history.

(56) References Cited

U.S. PATENT DOCUMENTS

| | | | | |
|---|---|---|---|---|
| 9,608,692 | B2 * | 3/2017 | Bennett | H04B 3/56 |
| 9,705,571 | B2 * | 7/2017 | Gerszberg | H04L 5/003 |
| 9,749,053 | B2 * | 8/2017 | Henry | H01P 5/12 |
| 9,876,605 | B1 * | 1/2018 | Henry | H04B 3/54 |
| 9,893,795 | B1 * | 2/2018 | Henry | H04B 3/36 |
| 9,911,020 | B1 * | 3/2018 | Liu | G06K 7/10366 |
| 11,799,552 | B2 * | 10/2023 | Lee | H01S 5/50 |
| 12,019,289 | B2 * | 6/2024 | Winzer | G02B 6/4292 |
| 2003/0095737 | A1 * | 5/2003 | Welch | G02B 6/136 |
| | | | | 385/14 |
| 2005/0201715 | A1 * | 9/2005 | Ellwood | G02B 6/2746 |
| | | | | 385/147 |
| 2006/0222367 | A1 * | 10/2006 | Onaka | H04J 14/02216 |
| | | | | 398/83 |
| 2006/0239609 | A1 * | 10/2006 | Sorin | H04J 14/0282 |
| | | | | 385/24 |
| 2009/0196607 | A1 * | 8/2009 | Kai | H04J 14/0284 |
| | | | | 398/45 |
| 2012/0093518 | A1 * | 4/2012 | Tosetti | H04J 14/0265 |
| | | | | 398/79 |
| 2013/0114958 | A1 * | 5/2013 | Farell | H04B 10/275 |
| | | | | 398/49 |
| 2017/0019168 | A1 * | 1/2017 | Menard | H04J 14/0213 |
| 2018/0249526 | A1 * | 8/2018 | Nagaraja | H04B 17/336 |
| 2019/0364492 | A1 * | 11/2019 | Azizi | H04W 52/0264 |
| 2020/0033535 | A1 * | 1/2020 | Petersen | G02B 6/2558 |
| 2022/0224605 | A1 * | 7/2022 | Jain | G06F 9/30043 |
| 2023/0422202 | A1 * | 12/2023 | Manolakos | H04W 64/00 |

FOREIGN PATENT DOCUMENTS

| | | | | |
|---|---|---|---|---|
| EP | 1170604 A2 * | 1/2002 | ........ | G02B 6/03694 |
| JP | 2002509285 A | 3/2002 | | |
| JP | 2007067948 A | 3/2007 | | |
| JP | 2013074628 A | 4/2013 | | |

OTHER PUBLICATIONS

Fuad E. Doany et al., "Multichannel High-Bandwidth Coupling of Ultradense Silicon Photonic Waveguide Array to Standard-Pitch Fiber Array," Oct. 18, 2010, Journal of Lightwave Technology, vol. 29, No. 4, Feb. 15, 2011,pp. 475-480.*

Pablo Torres-Ferrera et al., "Upstream and Downstream Analysis of an Optical Fronthaul System Based on DSP-Assisted Channel Aggregation," Dec. 1, 2017,vol. 9, No. 12/Dec. 2017/J. Opt. Commun. Network,vol. 9, No. 12/Dec. 2017 pp. 1191-1200.*

Rizwan Aslam Butt et al., "Efficient upstream bandwidth utilization with minimum bandwidth waste for time and wavelength division passive optical network," Dec. 2, 2019,Optical and Quantum Electronics (2020) 52:14,pp. 1-22.*

Paola Iovanna et al., "Optical Technology for NFV Converged Networks," Feb. 8, 2021, Applied science 2021, 11, 1522,pp. 1-18.*

PCT International Search Report, mailed Nov. 16, 2022, in connection with International Application No. PCT/EP2022/067976, all pages.

PCT Written Opinion, mailed Nov. 16, 2022, in connection with International Application No. PCT/EP2022/067976, all pages.

Japanese Decision to Grant Patent issued Feb. 25, 2025 in connection with JP Application No. 2023-580678, 6 pages.

* cited by examiner

LATENCY EQUALIZATION FOR OPTICAL FILTER

TECHNICAL FIELD

Embodiments of the present disclosure relate to optical communication, and particularly to padding units, optical devices, and methods for manufacturing padding units.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Latency imbalance is a critical parameter in today $5^{th}$ Generation (5G) networks since it affects 5G performances. The maximum allowed value for proper operation is roughly <+/−65 ns. Along the chain of communication path, i.e., the link between basebands and radios for Radio Access Network (RAN), there are several items that could impact the latency balance for the 5G networks. These include active devices such as Small Form-factor Pluggable (SFP) transceivers, Fronthaul (FH) units (that could be both active and passive, or only passive, such as an optical multiplexer/demultiplexer), where latency imbalance is already under control as well as the use of duplex fiber.

However, there currently still exist certain challenge(s). Specifically, the latency imbalance at optical filters does not seem to be as controlled. Currently, manufacturing of optical filters is optimized for cost-performance flexibility and availability. Thin film filter is provided as a solution for situations where low channel count, low cost, and low optical loss are required. A thin film filter module includes cascading 3-ports single filters that are spliced together. For example, FIG. 1 is a scheme of a thin film filter module, e.g., a Dense Wavelength Division Multiplexing (DWDM) Fronthaul optical thin film filter which includes a plurality of channels.

Thin film filter modules with lower or higher port counts all include 3-ports single filters spliced together in a manner similar as shown in FIG. 1.

Each connection between one single filter and another is about 0.5-0.7 m. It may be assumed that 1 m of single mode fiber has a delay of 5 ns. In single fiber configuration, the upstream channel and the downstream channel are typically close to one another, e.g., spaced adjacent to each other in wavelength, so as to reduce or minimize the difference in delays over the optical paths. This difference in delays due to propagation in these channels has a negligible contribution over the fronthaul distance, which is about 15 km.

FIG. 2 shows the internal build of a thin film filter module. Depending on the materials available at different suppliers, the internal scheme of a thin film filter module may vary.

Returning to the scheme shown in FIG. 1, in this example channel 37 (CH37) and channel 36 (CH36), which form a pair of coupled channels, are separated by about 5.5-7.7 m of fiber, meaning that there is a delay of around 27.5 ns (=5.5×5 ns) to 38.5 ns (=7.7×5 ns). Therefore, the delay symmetry is broken just by a single filter, which introduces a high value of latency imbalance. Cascading another filter in the configuration would mean potentially exceeding the allowed margin of 65 ns. The imbalance in latency between the upstream direction and the downstream direction may cause a serious impact on 5G operation.

SUMMARY

Certain aspects of the present disclosure and their embodiments may provide solutions to these or other challenges. According to certain embodiments, a solution is proposed to introduce latency padding which is internal to the optical filter module so as to reduce the latency imbalance (or equalize the latency) between the upstream and downstream channels. The latency padding may be achieved by introducing a stretch of fiber with a specific length so as to introduce the same delay as that in the coupled channel.

There are, proposed herein, various embodiments which address one or more of the issues disclosed herein.

According to certain embodiments described herein, there is provided a padding unit comprising one or more fiber paddings. Each of the one or more fiber paddings is for a respective one of one or more pairs of coupled channels in an optical device. At each pair of coupled channels, one channel in the pair of coupled channels is used as an upstream channel and the other channel in the pair of coupled channels is used as a downstream channel. Each fiber padding comprises a padding length of fiber configured to offset at least a part of a latency imbalance at the respective pair of coupled channels, the latency imbalance being a difference in latencies between the respective upstream and downstream channels caused by a difference in the multiplexing or demultiplexing path lengths of the respective upstream and downstream channels.

In some embodiments, the padding unit may comprise a plurality of fiber paddings. In these embodiments, each of the plurality of fiber paddings may be for a respective one of at least a subset of the plurality of pairs of coupled channels in the device. The padding length of fiber at each of the plurality of fiber paddings may be configured to offset at least a part of the latency imbalance at the respective pair of coupled channels such that the differences in latency imbalances across the pairs of coupled channels are reduce. Alternatively, the padding length of fiber at each of the plurality of fiber paddings may be configured to offset at least a part of a latency in at least one channel at the respective pair of coupled channels, such that the latencies across all channels in the plurality of pairs of coupled channels are equalized at a common value.

In some embodiments, the padding length of fiber of each fiber padding may be arranged at an exit of the respective pair of coupled channels.

In some embodiments, the padding length of each fiber padding may be determined based on a nominal splice length of fibers in the respective pair of coupled channels.

In some embodiments, the padding length of each fiber padding may be determined based on a measured difference in path lengths of the upstream channel and the downstream channel in the respective pair of coupled channels, subsequent to splicing of fibers in the respective pair of couple channels.

In some embodiments, the padding length of each fiber padding may be determined based on measured delays in the upstream and downstream channels of the respective pair of coupled channels, the delays being caused by the path lengths of the respective upstream and downstream channels.

According to certain embodiments, there is provided an optical device comprising: one or more pairs of coupled channels, wherein at each pair of coupled channels one of the channels is used as an upstream channel and the other one of the channels is used as a downstream channel, and a padding unit as described herein, for at least one of the one or more pairs of coupled channels.

According to certain embodiments, there is provided a method for manufacturing a padding unit. The padding unit comprises one or more fiber paddings, each of the one or more fiber paddings being for a respective one of one or more pairs of coupled channels in an optical device. At each pair of coupled channels, one channel in the pair of coupled channels is used as an upstream channel and the other channel in the pair of coupled channels is used as a downstream channel. The method comprises: determining a padding length for a respective one of the one or more fiber paddings, wherein the padding length offsets at least a part of a latency imbalance at the respective pair of coupled channels, the latency imbalance being a difference in latencies between the respective upstream and downstream channels caused by a difference in the multiplexing or demultiplexing path lengths of the respective upstream and downstream channels; and forming the one or more fiber paddings based on the one or more determined padding lengths.

In some embodiments, the padding unit may comprise a plurality of fiber paddings. In these embodiments, each fiber padding may be for a respective one of at least a subset of a plurality of pairs of coupled channels in the optical device. The padding length of fiber at each of the plurality of fiber paddings may be configured to offset at least a part of the latency imbalance at the respective pair of coupled channels such that the differences in latency imbalances across the pairs of coupled channels are reduced. Alternatively, the padding length of fiber at each of the plurality of fiber paddings is configured to offset at least a part of a latency in at least one channels at the respective pair of coupled channels, such that the latencies across all channels in the plurality of pairs of coupled channels are equalized at a common value.

In some embodiments, determining the padding length of each fiber padding may be based on one of: a nominal splice length of fibers in the respective pair of coupled channels; a measured difference in path lengths of the upstream channel and the downstream channel in the respective pair of coupled channels, subsequent to splicing of fibers in the respective pair of couple channels; and measured delays in the upstream and downstream channels of the respective pair of coupled channels, wherein the delays are caused by the path lengths of the respective upstream and downstream channels.

Certain embodiments may provide one or more of the following technical advantage(s). Certain embodiments allow latency imbalance in optical filter cassette/boxes, more specifically optical multiplexer/demultiplexers, to be reduced or minimized by introducing appropriate fiber padding. The solution proposed herein is easy to implement as the padding can be incorporated or built-in into current optical filters, and no external components/devices are required to achieve the latency equalization effect—there are no changes (or minimal changes) to current manufacturing processes of optical filters to include the latency paddings according to the proposed solution. Moreover, the proposed solution is low cost as the extra cost for the fiber material to produce the padding is negligible compared to the costs for producing other components in the optical filters. Furthermore, the proposed solution does not involve any change in the optical filter form factor, and therefore does not involve any change to the relevant installation guideline.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 3:
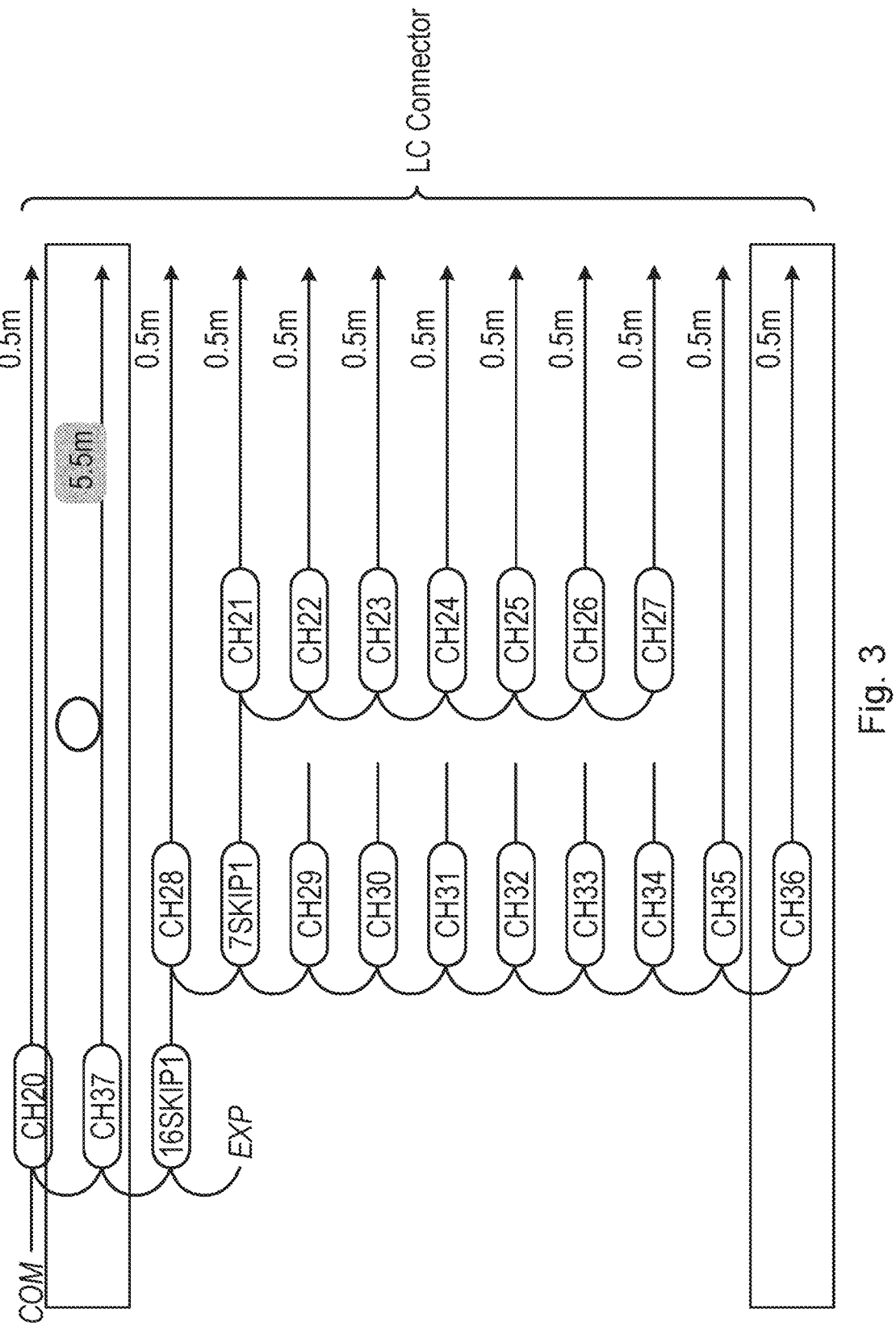
FIG. 3 is a schematic diagram illustrating a nine services optical thin film filter module including latency padding.

To explain some of the embodiments of the present disclosure by way of an example, FIG. 3 shows a diagram for 9 services optical thin film module including latency padding according to the proposed solution.

Figure 1:
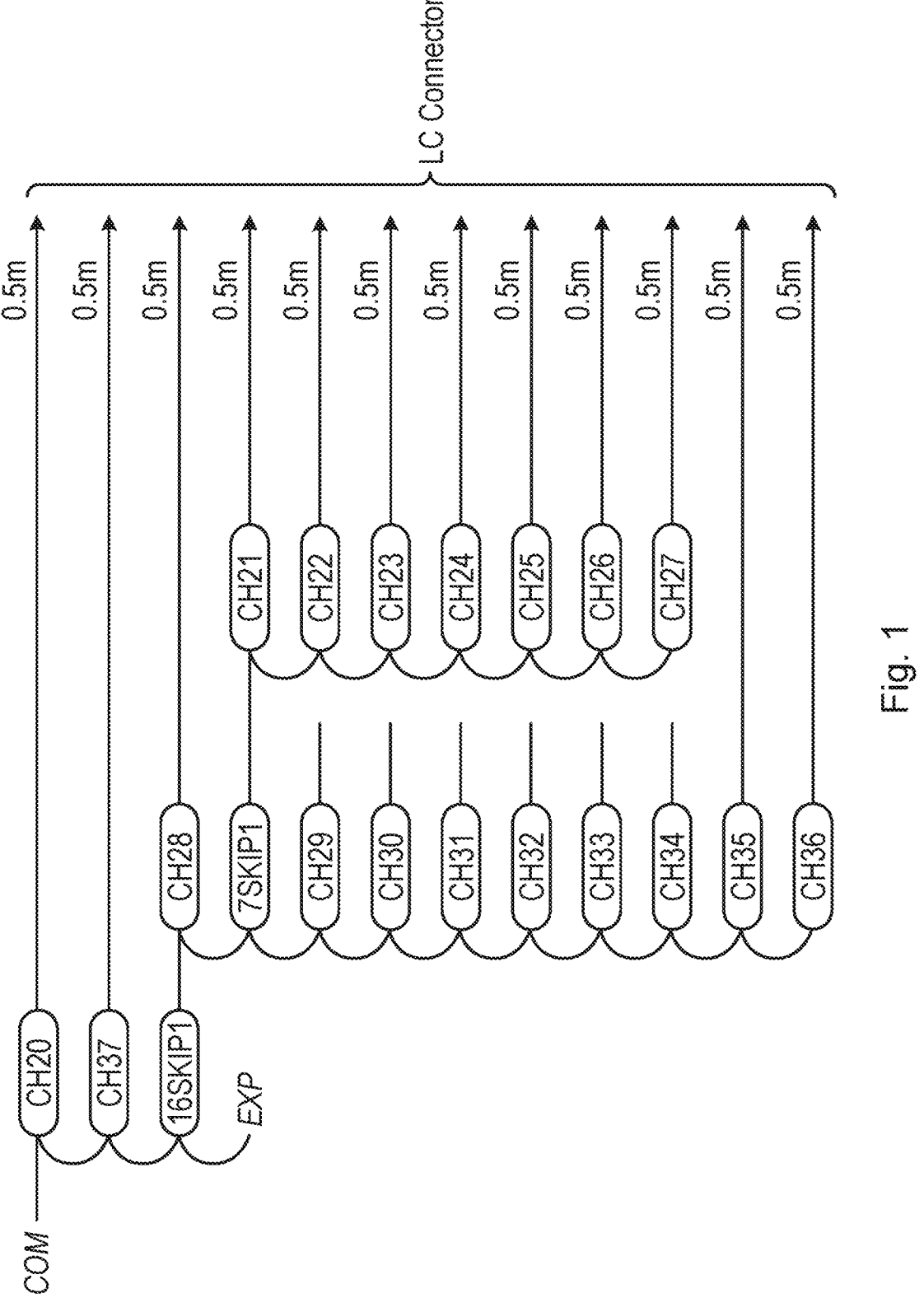
FIG. 1 is a schematic diagram illustrating an internal scheme of a nine services optical thin film filter module.
Figure 2:
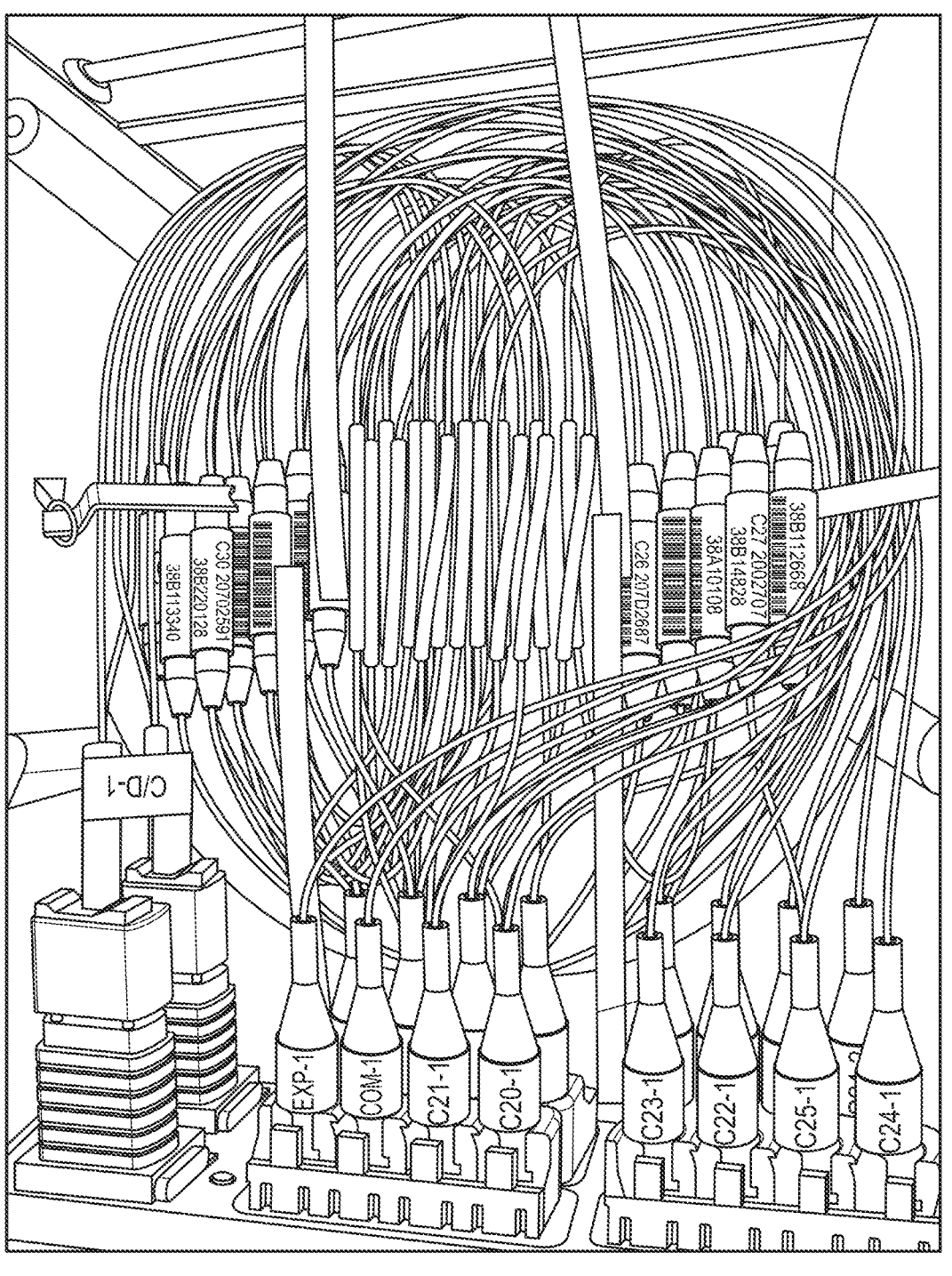
FIG. 2 is a photograph of an internal build of a thin film filter module.

The configuration shown in FIG. 3 corresponds to the one shown in FIG. 1, with the difference that the configured of FIG. 3 further includes latency padding for channels 36 and 37. As mentioned above with reference to FIG. 1, channel 36 (CH36) and channel (CH37), which are a pair of coupled channels where channel 36 is used or arranged as an upstream channel and channel 37 is used or arranged as a downstream channel, or where channel 36 is used or arranged as a downstream channel and channel 37 is used or arranged as an upstream channel, are separated by about 5.5-7.7 m of fiber. Therefore, channel 36 has around 27.5 to 38.5 ns of additional delay with respect to channel 37.

To reduce the latency imbalance between channels 36 and 37, in this example a length of fiber of an appropriate length can be introduced at the exit of the coupled channels. As shown in FIG. 3, instead of 0.5 m, a length of fiber is added to channel 37 such that the (padded) fiber at the channel is 5.5 m. Hence, the additional around 27.5 to 38.5 ns of delay at channel 36 is matched by the delay at channel 37. The same approach may be applied to all the paired channels in the filter module to include respective appropriate lengths of fibers to the coupled channels to reduce respective latency imbalances.

The length of the fiber for the latency padding may be determined according to one of the following:

(1) Determining the length of the fiber based on the assumption that the splice length of the fibers in the coupled channels is (at least close to) a nominal splice length (2) Measuring the actual lengths of the fibers in the coupled channels after splicing (as splicing may have to be repeated during the manufacturing process), and determining the length of the fiber required to compensate the difference in lengths of optical paths based on the measured lengths (3) Measure the actual delays (e.g., using proper instrumentation) at the upstream and downstream channels, and determining the length of the fiber required to compensate the difference in delays caused by the difference in lengths of optical paths based on the measured delays There is an increase in complexity from techniques (1) to (3) in terms of implementation. However, the accuracy of the compensation (of the latency imbalance) also increases along with the complexity. The technique chosen to determine the padding length may therefore be selected depending on factors such as cost considerations and the availability of measurement instrumentations (for measuring length or for measuring delays).

According to some embodiments of the present disclosure, a padding unit comprising one or more fiber paddings is provided.

In an embodiment, the padding unit may comprise a single fiber padding, and the fiber padding may be for a specific pair of coupled channels in an optical device such as an optical multiplexer or demultiplexer device. The coupled channels include one channel which is used (or arranged) as an upstream channel, and another channel which is used (or arranged) as a downstream channel. The fiber padding in this embodiment may include a padding length of fiber (which may be added/affixed to one of the channels) to offset at least a part of a latency imbalance at the pair of coupled channels. The latency imbalance refers to a difference in latencies (or delays) between the upstream channel and the downstream channel (e.g. the difference between the time taken for a signal to traverse the upstream channel and the downstream channel), which is caused by a difference in the multiplexing/demultiplexing path lengths of the upstream channel and the downstream channel. In some embodiments, the padding length may be determined such that when the fiber padding is added to a channel in the coupled channel, the length of fiber equalizes the latencies between the two channels in the pair of coupled channels (or at least reduces the difference in latencies, preferably minimizing the difference in latencies to a negligible degree).

In this embodiment, the padding length of fiber of each fiber padding may be configured to be arranged at an exit of the respective pair of coupled channels.

The padding length of the fiber padding may be determined (or configured) based on a nominal splice length of fibers in the pair of coupled channels, or based on a measured difference in path lengths of the upstream channel and the downstream channel in the pair of coupled channels, subsequent to splicing of fibers in the pair of couple channels, or based on measured delays in the upstream and downstream channels of the pair of coupled channels, the delays being caused (at least partly) by the path lengths of the upstream and downstream channels.

In another embodiment, the padding unit may comprise a plurality of fiber paddings. In this embodiment, each of the plurality of fiber paddings may be for a respective one of at least a subset of a plurality of pairs of coupled channels in an optical multiplexer or demultiplexer device. For example, in some embodiments only some pairs of coupled channels (out of all the coupled channels) are (each) provided with a fiber padding. Similar to the embodiment described above, each pair of coupled channels include one channel which is used or arranged as an upstream channel, and another channel which is used or arranged as a downstream channel.

Each fiber padding in this embodiment may include an individual padding length of fiber (which may be added/affixed to one of the channels at a respective pair of coupled channels) to offset at least a part of a latency imbalance at the respective pair of coupled channels. As mentioned above, the latency imbalance refers to a difference in latencies (or delays) between the upstream channel and the downstream channel in the respective pair of coupled channels, which is caused by a difference in the multiplexing/demultiplexing path lengths of the upstream channel and the downstream channel in the respective pair of coupled channels.

More particularly, in this embodiment, the padding length of fiber at each of the plurality of fiber paddings may be configured to offset at least a part of the latency imbalance at the respective pair of coupled channels such that the differences in latency imbalances across the pairs of coupled channels are reduced. In some embodiments, the latency imbalances across all pairs of coupled channels in the optical multiplexer or demultiplexer device may be equalized by use of the plurality of fiber paddings. The padding length of fiber of each fiber padding may be configured to be arranged at an exit of the respective pair of coupled channels, for example.

Alternatively, in this embodiment the padding length of fiber at each of the plurality of fiber paddings may be configured to offset at least a part of latency in at least one channel at the respective pair of coupled channels, such that the latencies across all channels in the plurality of pairs of coupled channels are equalized at a common value.

The padding length of each fiber padding may be determined based on a nominal splice length of fibers in the respective pair of coupled channels, or based on a measured difference in path lengths of the upstream channel and the downstream channel in the respective pair of coupled channels, subsequent to splicing of fibers in the respective pair of couple channels, or based on measured delays in the upstream and downstream channels of the respective pair of coupled channels, the delays being caused by the path lengths of the respective upstream and downstream channels.

According to some embodiments of the present disclosure, an optical device is provided e.g. an optical multiplexer or demultiplexer device. The device comprises one or more pairs of coupled channels, and at (or in) each pair of coupled channels one of the channels is used (or arranged) as an upstream channel and the other one of the channels is used (or arranged) as a downstream channel. The device further comprises a padding unit as described herein, for example according to one of the embodiments described above. For example, the device may comprise a padding unit which in turn comprises a plurality of fiber paddings for some of the pairs of coupled channels in the device.

According to some embodiments of the present invention, a network node is provided. The network node comprises an optical device, e.g. an optical multiplexer or demultiplexer device, comprising a padding unit as described above. The network node may be a fronthaul network node.

Figure 4:
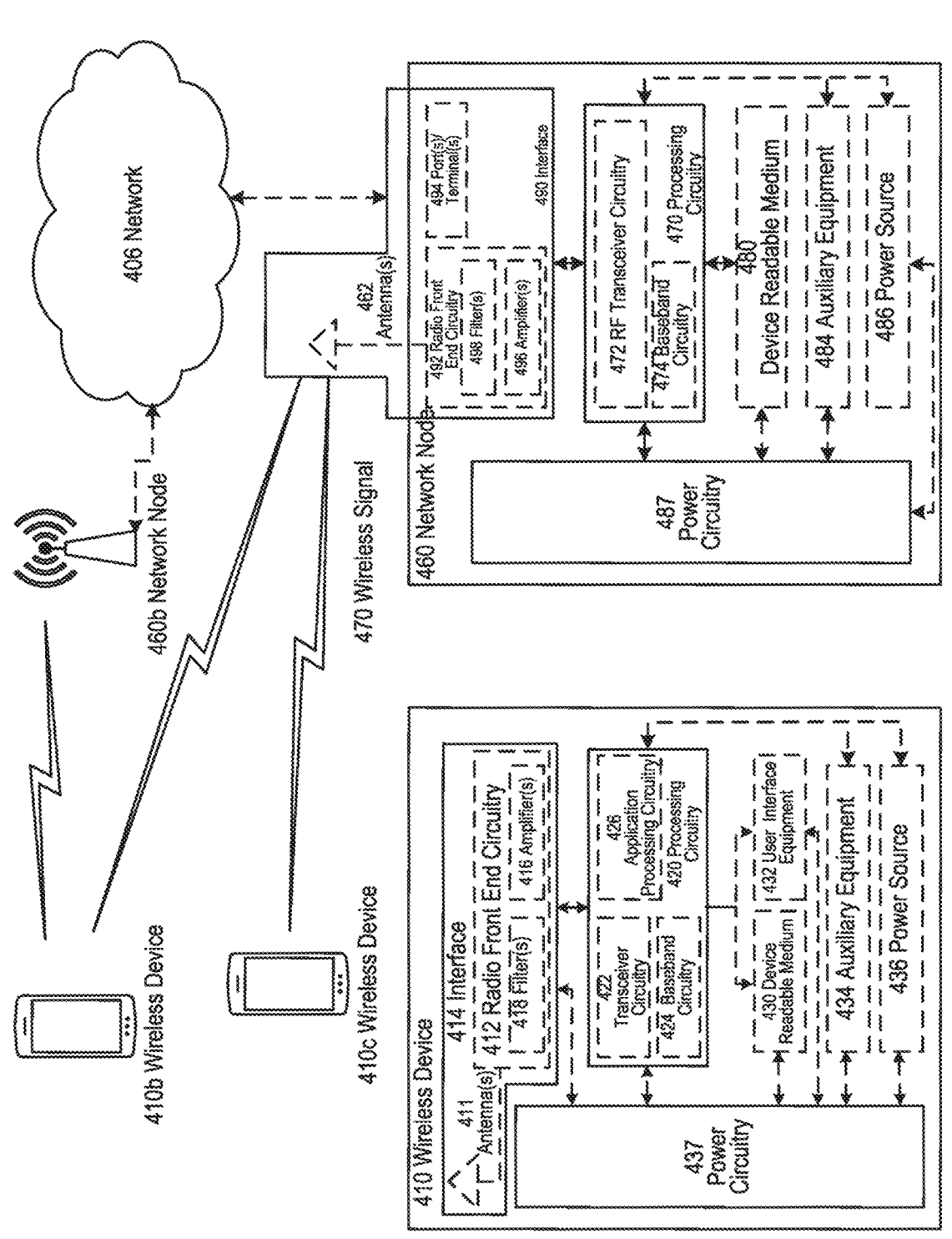
FIG. 4 schematically illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As illustrated, wireless device 410 includes antenna 411, interface 414, processing circuitry 420, device readable medium 430, user interface equipment 432, auxiliary equipment 434, power source 436 and power circuitry 437.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. As illustrated, processing circuitry 420 includes one or more of RF transceiver circuitry 422, baseband processing circuitry 424, and application processing circuitry 426. As used herein, "network node" refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and New Radio NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centres, Mobility Management Entities), Operation and Maintenance nodes, Operations Support System nodes, Self-Organized Network nodes, positioning nodes (e.g., Evolved Serving Mobile Location Centres), and/or Minimization of Drive Tests. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

In some embodiments, processing circuitry 470 may include one or more of radio frequency (RF) transceiver circuitry 472 and baseband processing circuitry 474.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. In particular embodiments, the port(s)/terminal(s) 494 may comprise an optical multiplexer and/or demultiplexer device as described herein. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470.

According to some embodiments of the present disclosure, there is provided a method for manufacturing a padding unit. This method will be explained in more detail below with reference to FIG. 5. Also, according to some embodiments of the present disclosure, there is provide a method for manufacturing an optical multiplexer or demultiplexer device. This method will also be explained in more detail below.

Figure 5:
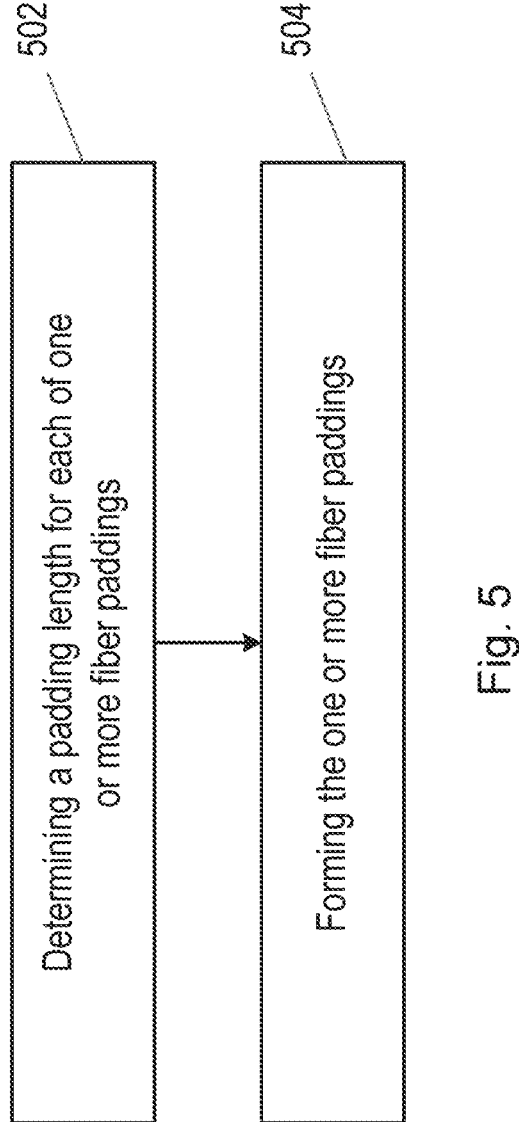
FIG. 5 is a flowchart illustrating a method in accordance with some embodiments.

FIG. 5 depicts a method in accordance with particular embodiments for manufacturing a padding unit which comprises one or more fiber paddings, each of the fiber paddings being for a respective one of one or more pairs of coupled channels in an optical multiplexer or demultiplexer device. At each pair of coupled channels, one channel in the pair of coupled channels is used as an upstream channel and the other channel in the pair of coupled channels is used as a downstream channel.

The method begins at step 502 with determining a padding length for each of the one or more fiber paddings. The padding length offsets at least a part of a latency imbalance at the respective pair of coupled channels, the latency imbalance being a difference in latencies between the respective upstream and downstream channels caused by a difference in the multiplexing or demultiplexing path lengths of the respective upstream and downstream channels.

In some embodiments, the padding unit may comprise a plurality of fiber paddings, each fiber padding being for a respective one of at least a subset of a plurality of pairs of coupled channels in the optical multiplexer or demultiplexer device. In these embodiments, the padding length of fiber at each of the plurality of fiber paddings may be configured to offset at least a part of the latency imbalance at the respective pair of coupled channels such that the differences in latency imbalances across the pairs of coupled channels are reduced (and preferably minimized). Alternatively, in these embodiments, the padding length of fiber at each of the plurality of fiber paddings may be configured to offset at least a part of a latency in at least one channel at the respective pair of coupled channels, such that the latencies across all channels in the plurality of pairs of coupled channels are equalized at a common value.

In some embodiments, determining the padding length of each fiber padding at step 502 may be based on one of: a nominal splice length of fibers in the respective pair of coupled channels, a measured difference in path lengths of the upstream channel and the downstream channel in the respective pair of coupled channels, subsequent to splicing of fibers in the respective pair of couple channels, and measured delays in the upstream and downstream channels of the respective pair of coupled channels, the delays being caused by the path lengths of the respective upstream and downstream channels.

Then, the method proceeds to step 504 with forming the one or more fiber paddings based on the one or more determined padding lengths.

Although not shown in FIG. 5, it will be appreciated that according to some embodiments there is also provided a method for manufacturing an optical device (e.g. an optical multiplexer or demultiplexer device). The optical device such as an optical multiplexer or demultiplexer device comprises one or more pairs of coupled channels and a padding unit as described herein. In these embodiments, the method may comprise, in addition to steps 502 and 504 in FIG. 5: forming the one or more pairs of coupled channels, each pair of coupled channels including a channel that is to be used as an upstream channel and a channel which is to be used as a downstream channel, and affixing (or connecting) each of the one or more fiber paddings to a respective one of the one or more pairs of coupled channels. In an embodiment a method for manufacturing an optical device (e.g. an optical multiplexer or demultiplexer device) comprises providing one or more pairs of coupled channels as described herein and affixing (or connecting) each of one or more fiber paddings as described herein to a respective one of the one or more pairs of coupled channels.

The invention claimed is:

1. An optical device comprising:
   one or more pairs of coupled channels, wherein at each pair of coupled channels one of the channels is used as an upstream channel and the other one of the channels is used as a downstream channel; and
   a padding unit for at least one of the one or more pairs of coupled channels, the padding unit comprising:
      one or more fiber paddings, wherein each of the one or more fiber paddings is for a respective one of one or more pairs of coupled channels in the optical device,
      wherein each fiber padding comprises a padding length of fiber configured to offset at least a part of a latency imbalance at the respective pair of coupled channels, wherein the latency imbalance is a difference in latencies between the respective upstream and downstream channels caused by a difference in multiplexing or demultiplexing path lengths of the respective upstream and downstream channels.

2. The optical device of claim 1, wherein the padding unit comprises a plurality of fiber paddings, wherein each of the plurality of fiber paddings is for a respective one of at least a subset of the plurality of pairs of coupled channels in the optical device, and wherein the padding length of fiber at each of the plurality of fiber paddings is configured to offset at least a part of the latency imbalance at the respective pair of coupled channels such that the differences in latency imbalances across the pairs of coupled channels are reduced.

3. The optical device of claim 1, wherein the padding unit comprises a plurality of fiber paddings, wherein each of the plurality of fiber paddings is for a respective one of at least a subset of the plurality of pairs of coupled channels in the optical device, and wherein the padding length of fiber at each of the plurality of fiber paddings is configured to offset at least a part of a latency in at least one channel at the respective pair of coupled channels, such that the latencies across all channels in the plurality of pairs of coupled channels are equalized at a common value.

4. The optical device according to claim 1, wherein padding length of fiber of each fiber padding is arranged at an exit of the respective pair of coupled channels.

5. The optical device according to claim 1, wherein the padding length of each fiber padding is determined based on a nominal splice length of fibers in the respective pair of coupled channels.

6. The optical device according to claim 1, wherein the padding length of each fiber padding is determined based on a measured difference in path lengths of the upstream channel and the downstream channel in the respective pair of coupled channels, subsequent to splicing of fibers in the respective pair of couple channels.

7. The optical device according to claim 1, wherein the padding length of each fiber padding is determined based on measured delays in the upstream and downstream channels of the respective pair of coupled channels, wherein the delays are caused by the path lengths of the respective upstream and downstream channels.

8. The optical device according to claim 1, wherein the optical device is an optical filter module.

9. The optical device according to claim 1, wherein the optical device is an optical multiplexer or demultiplexer device.

10. A network node comprising an optical device according claim 1.

11. The network node of claim 10, wherein the network node is a fronthaul network node.

12. A padding unit comprising one or more fiber paddings, wherein each of the one or more fiber paddings is for a respective one of one or more pairs of coupled channels in an optical device, wherein at each pair of coupled channels, one channel in the pair of coupled channels is used as an upstream channel and the other channel in the pair of coupled channels is used as a downstream channel, wherein each fiber padding comprises a padding length of fiber configured to offset at least a part of a latency imbalance at the respective pair of coupled channels, wherein the latency imbalance is a difference in latencies between the respective upstream and downstream channels caused by a difference in multiplexing or demultiplexing path lengths of the respective upstream and downstream channels.

13. The padding unit according to claim 12, wherein padding unit comprises a plurality of fiber paddings, wherein each of the plurality of fiber paddings is for a respective one of at least a subset of the plurality of pairs of coupled channels in the optical device, and wherein the padding length of fiber at each of the plurality of fiber paddings is configured to offset at least a part of the latency imbalance at the respective pair of coupled channels such that the differences in latency imbalances across the pairs of coupled channels are reduced.

14. The padding unit according to claim 12, wherein the padding unit comprises a plurality of fiber paddings, wherein each of the plurality of fiber paddings is for a respective one of at least a subset of the plurality of pairs of coupled channels in the optical device, and wherein the padding length of fiber at each of the plurality of fiber paddings is configured to offset at least a part of a latency in at least one channel at the respective pair of coupled channels, such that the latencies across all channels in the plurality of pairs of coupled channels are equalized at a common value.

15. The padding unit according to claim 12, wherein the padding length of fiber of each fiber padding is for arranging at an exit of the respective pair of coupled channels.

16. The padding unit according to claim 12, wherein the padding length of each fiber padding is determined based on a nominal splice length of fibers in the respective pair of coupled channels.

17. The padding unit according to claim 12, wherein the padding length of each fiber padding is determined based on a measured difference in path lengths of the upstream channel and the downstream channel in the respective pair of coupled channels, subsequent to splicing of fibers in the respective pair of couple channels.

18. The padding unit according to claim 12, wherein the padding length of each fiber padding is determined based on measured delays in the upstream and downstream channels of the respective pair of coupled channels, wherein the delays are caused by the path lengths of the respective upstream and downstream channels.

19. A method for manufacturing a padding unit, wherein the padding unit comprises one or more fiber paddings, wherein each of the one or more fiber paddings is for a respective one of one or more pairs of coupled channels in an optical device, and wherein at each pair of coupled channels, one channel in the pair of coupled channels is used as an upstream channel and the other channel in the pair of coupled channels is used as a downstream channel, the method comprising:

determining a padding length for each of the one or more fiber paddings, wherein the padding length offsets at least a part of a latency imbalance at the respective pair of coupled channels, the latency imbalance being a difference in latencies between the respective upstream and downstream channels caused by a difference in the multiplexing or demultiplexing path lengths of the respective upstream and downstream channels; and forming the one or more fiber paddings based on the one or more determined padding lengths.

20. The method according to claim 19, wherein the padding unit comprises a plurality of fiber paddings, wherein each fiber padding is for a respective one of at least a subset of a plurality of pairs of coupled channels in the optical device, and wherein the padding length of fiber at each of the plurality of fiber paddings is configured to offset at least a part of the latency imbalance at the respective pair of coupled channels such that the differences in latency imbalances across the pairs of coupled channels are reduced.

21. The method according to claim 19, wherein the padding unit comprises a plurality of fiber paddings, wherein each fiber padding is for a respective one of at least a subset of a plurality of pairs of coupled channels in the optical device, and wherein the padding length of fiber at each of the plurality of fiber paddings is configured to offset at least a part of a latency in at least one channel at the respective pair of coupled channels, such that the latencies across all channels in the plurality of pairs of coupled channels are equalized at a common value.

22. The method according to claim 19, wherein determining the padding length of each fiber padding is based on one of:

a nominal splice length of fibers in the respective pair of coupled channels;

a measured difference in path lengths of the upstream channel and the downstream channel in the respective pair of coupled channels, subsequent to splicing of fibers in the respective pair of couple channels; and measured delays in the upstream and downstream channels of the respective pair of coupled channels, wherein the delays are caused by the path lengths of the respective upstream and downstream channels.

* * * * *